(12) United States Patent
Tsu et al.

(10) Patent No.: US 7,991,939 B1
(45) Date of Patent: Aug. 2, 2011

(54) DUMMY ACCESSES TO ENSURE CPU EXITS LOWER-POWER STATE

(75) Inventors: William Tsu, San Jose, CA (US); Ashish Kaul, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1266 days.

(21) Appl. No.: 11/610,502

(22) Filed: Dec. 13, 2006

(51) Int. Cl.
*G06F 13/36* (2006.01)

(52) U.S. Cl. .......................... 710/311; 713/320

(58) Field of Classification Search .................. 713/300, 713/310, 320, 323–324; 710/311–313
See application file for complete search history.

(56) References Cited

U.S. PATENT DOCUMENTS

| | | | | |
|---|---|---|---|---|
| 6,000,035 A * | 12/1999 | Matsushima et al. | ......... | 713/320 |
| 6,751,741 B1 * | 6/2004 | Kawahara et al. | ............ | 713/320 |
| 6,801,974 B1 * | 10/2004 | Watts et al. | .................... | 710/303 |
| 7,126,608 B2 * | 10/2006 | Alben et al. | .................. | 345/501 |
| 7,256,788 B1 * | 8/2007 | Luu et al. | ........................ | 345/501 |
| 7,515,935 B2 * | 4/2009 | Ibrahim et al. | ............. | 455/553.1 |
| 7,523,327 B2 * | 4/2009 | Cline et al. | .................... | 713/320 |
| 7,634,668 B2 * | 12/2009 | White et al. | .................. | 713/300 |
| 7,774,629 B2 * | 8/2010 | Huang et al. | .................. | 713/320 |

* cited by examiner

*Primary Examiner* — Raymond Phan
(74) *Attorney, Agent, or Firm* — Kilpatrick Townsend & Stockton LLP

(57) ABSTRACT

Circuits, methods, and apparatus that provide transactions to wake an external device from a low-power state before a data transfer. This prevents an interruption that would be caused if the external device exited the low-power state during the data transfer. One example monitors a need for data by a first device. At a predetermined time before data is needed, the first device sends a transaction to a second device. The transaction is intended to wake the second device from a low-power state. If the first device has information to indicate that the second device is not in a low-power state, this transaction can be skipped. The first device then requests data. Later transactions to the second device do not result in the second device exiting the low-power state and therefore do not interrupt or cause delays in the data transfer.

20 Claims, 9 Drawing Sheets

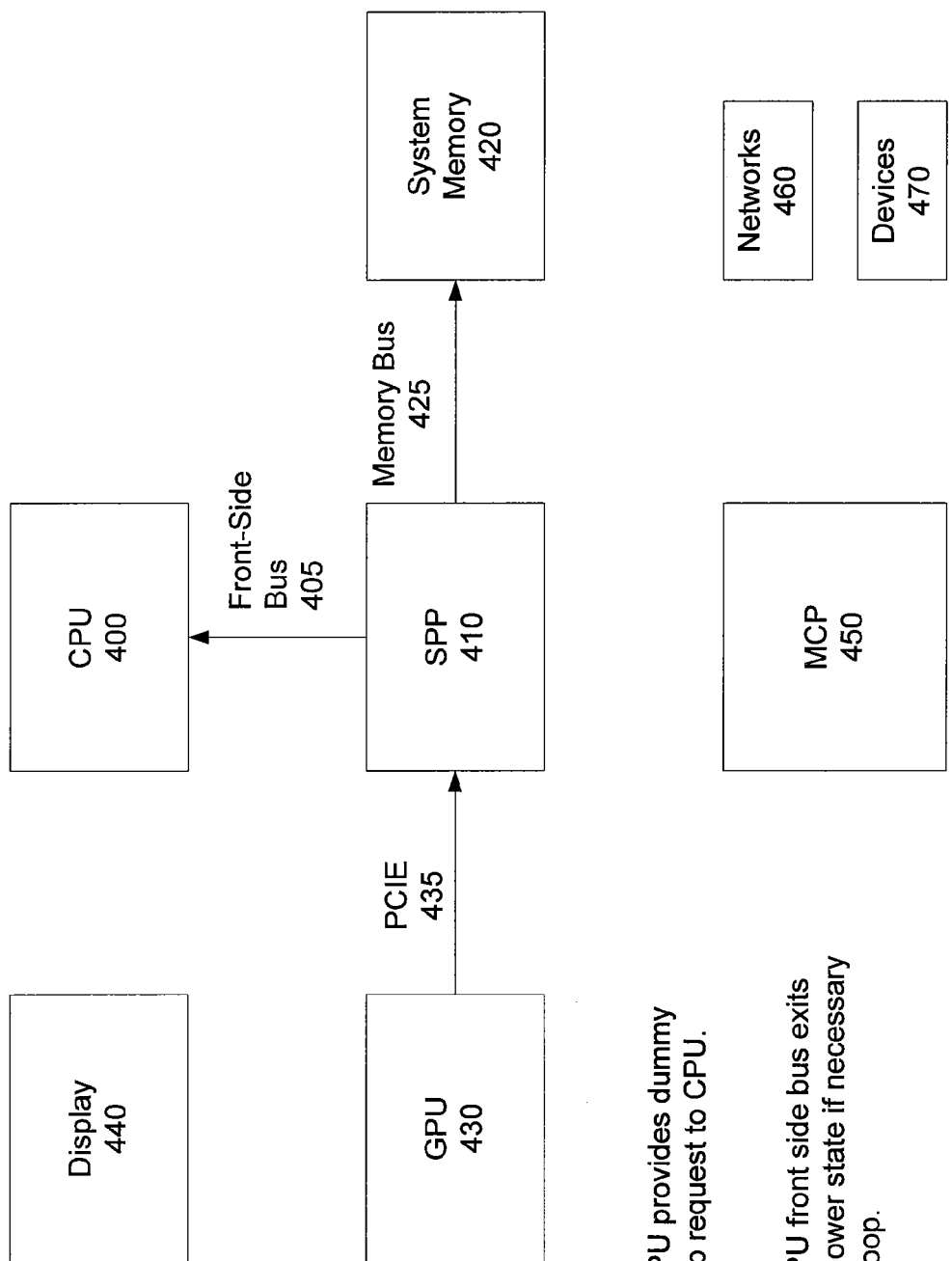

DUMMY ACCESSES TO ENSURE CPU EXITS LOWER-POWER STATE

CROSS-REFERENCES TO RELATED APPLICATIONS

This application is related to co-owned and co-pending U.S. patent application Ser. No. 11/253,438, titled "Zero Frame Buffer," filed Oct. 18, 2006, by Yeoh et al., which is incorporated by reference.

BACKGROUND

The present invention relates generally to data transfers for graphics processing units, and more particularly to preventing such data transfers from being interrupted.

An ingenious way to reduce costs for graphics processing systems has recently been developed by NVIDIA Corporation in Santa Clara, Calif. Specifically, the need for a local memory placed on a graphics card has been eliminated. These zero-frame-buffer graphics processors reduce costs and simplify manufacturing by eliminating multiple external memory devices and associated power supplies and board trace routing.

Instead of having a locally available memory, a zero-frame-buffer processor stores data in a system memory. That is, the zero-frame-buffer processor requests space in the system memory from the operating system, and uses this space to store display, computational, and other data. Details of this architecture can be found in co-pending and co-owned and co-pending U.S. patent application Ser. No. 11/253,438, titled Zero Frame Buffer, filed Oct. 18, 2006, by Yeoh et al., which is incorporated by reference. Another architecture includes a near-zero frame buffer, which is a smaller, limited memory used for special purposes, either on the graphics processor itself, or external to the device.

The elimination (or near elimination) of a local frame buffer provides many cost saving advantages. However, a zero-frame-buffer graphics processor does not have a local memory at its disposal; it relies on a system memory that is separated from the graphics processor by one or more devices, such as a Northbridge and CPU. As such, the ability of the graphics processor to read and write data from and to the system memory is dependent on the states and activities of these other devices. For example, if one of these other devices tie up the front-side bus for some amount of time, data transfers to and from the graphics processor may be interrupted and their completion delayed. One such interruption may occur when a CPU exits a low-power state during a transfer of data from a system memory to a graphics processor. When the CPU exits the low-power state, delays in data transfers from system memory are stalled. This can have particularly undesirable consequences when the data is display data, and the GPU runs out of data to display.

Thus, what is needed are circuits, methods, and apparatus that help to avoid these interruptions.

SUMMARY

Accordingly, embodiments of the present invention provide circuits, methods, and apparatus that provide transactions to wake a second device from a low-power state before a transfer of data occurs. This prevents interruptions of the data transfer that would otherwise be caused by the second device waking from the low-power state.

One exemplary embodiment of the present invention monitors a need for data by a first device. At a predetermined time before data is needed, the first device sends a transaction to a second device. The transaction is intended to wake the second device from a low-power state. If the first device has information to indicate that the second device is not in a low-power state, this transaction can be skipped. The first device can then request data. Other transactions to the second device do not result in the second device exiting the low-power state and therefore do not interrupt or cause delays in the data transfer.

Another exemplary embodiment of the present invention provides a GPU that sends transactions to a CPU ahead of a request for data from a system memory. The transaction may be dummy snoop request, an interrupt, or other transaction. The data requested from system memory can be display data, vertex, pixel, geometry, computational, or other data. Since the CPU is not in the low-power state, later transactions, such as other snoops, do not wake the CPU, thus the transfer of the requested data is not interrupted or delayed. In some circumstances, only one such transaction is sent to wake the CPU. In other circumstances, for example where the data transfer is particularly long, additional transactions may be needed to keep the CPU from returning to a low-power state.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIGS. 4A-B illustrate a GPU initiating a snoop request prior to a request for display data according to an embodiment of the present invention;

DESCRIPTION OF EXEMPLARY EMBODIMENTS

Figure 1:
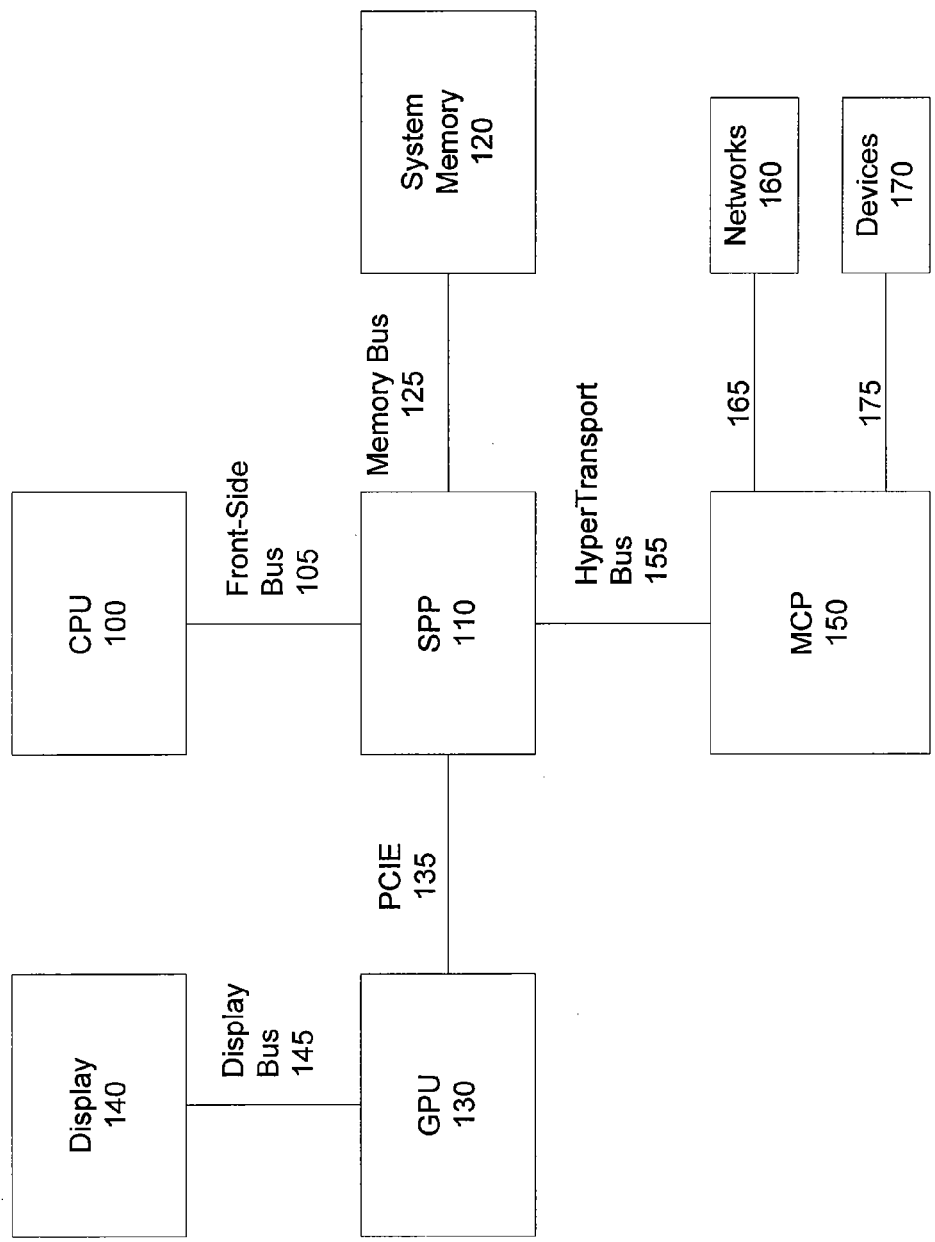
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, display 140, media communications processor (MCP) 150, networks 160, and internal and peripheral devices 170.

The CPU 100 connects to the SPP 110 over the front-side bus 105. The SPP 110 is in communication with the graphics processing unit 130 over a PCIE connection 135. The SPP 110 reads and writes data to and from the system memory 120 over the memory bus 125. The MCP 150 communicates with the SPP 110 via a high-speed connection, such as a Hyper- Transport bus 155, and connects networks 160 and internal and peripheral devices 170 to the remainder of the computer system. The graphics processing unit 130 receives data over the PCIE connection 135 and generates graphic and video images in the form of display data for display on monitor or display device 140. The graphics processing unit 130 stores the display data other graphics information in the system memory 120.

The CPU 100 may be a processor, such as those manufactured by Intel Corporation or other supplier, and is well-known by those skilled in the art. The SPP 110 and MCP 150 are commonly referred to as a chipset and each is typically an integrated circuit. In other systems that are improved by the incorporation of embodiments of the present invention, the SPP 110 and MCP 150 may be formed on the same integrated circuit. These may alternately be Northbridge and Southbridge devices. The system memory 120 is often a number of dynamic random access memory devices arranged in dual in-line memory modules (DIMMs). The graphics processing unit 130, SPP 110, and MCP 150 are preferably manufactured by NVIDIA Corporation.

The graphics processing unit 130 is often located on a daughter board or graphics card, or on a computer system motherboard, while the CPU 100, system platform processor 110, system memory 120, and media communications processor 150 are often located on a computer system motherboard. The graphics card is typically a printed-circuit board with the graphics processing unit 130 attached. The printed-circuit board typically includes two connectors, for example, a first PCIE connector attached to the printed-circuit board that fits into a PCIE slot included on the motherboard, and a second VGA or DVI (or both) connector for connecting to a monitor 140.

A computer system, such as the illustrated computer system, may include more than one GPU 130. Additionally, each of these graphics processing units may be located on a separate graphics card. Two or more of these graphics cards may be joined together by a jumper or other connection. This technology, the pioneering SLI™, has been developed by NVIDIA Corporation. In other embodiments of the present invention, one or more GPUs may be located on one or more graphics cards, while one or more others are located on the motherboard. For example, the SPP 110 can communicate with a switch device (not shown), where the other side of the switch device is in communication with two or more GPUs.

While this embodiment provides a specific type computer system that may be improved by the incorporation of an embodiment of the present invention, other types of electronic or computer systems may also be improved. For example, video and other game systems, navigation, set-top boxes, pachinko machines, and other types of electronic systems may be improved by the incorporation of embodiments of the present invention. While embodiments of the present invention are well suited to graphics processing units, other types of graphics processors, as well as other processors, may benefit from the incorporation of an embodiment of the present invention. For example, multi or general-purpose processors, or other processors, such as integrated graphics processors or general-purpose graphics processing units, may benefit from the incorporation of an embodiment of the present invention.

Also, while these types of computer systems, and the other electronic systems described herein, are presently commonplace, other types of computer and electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Figure 2:
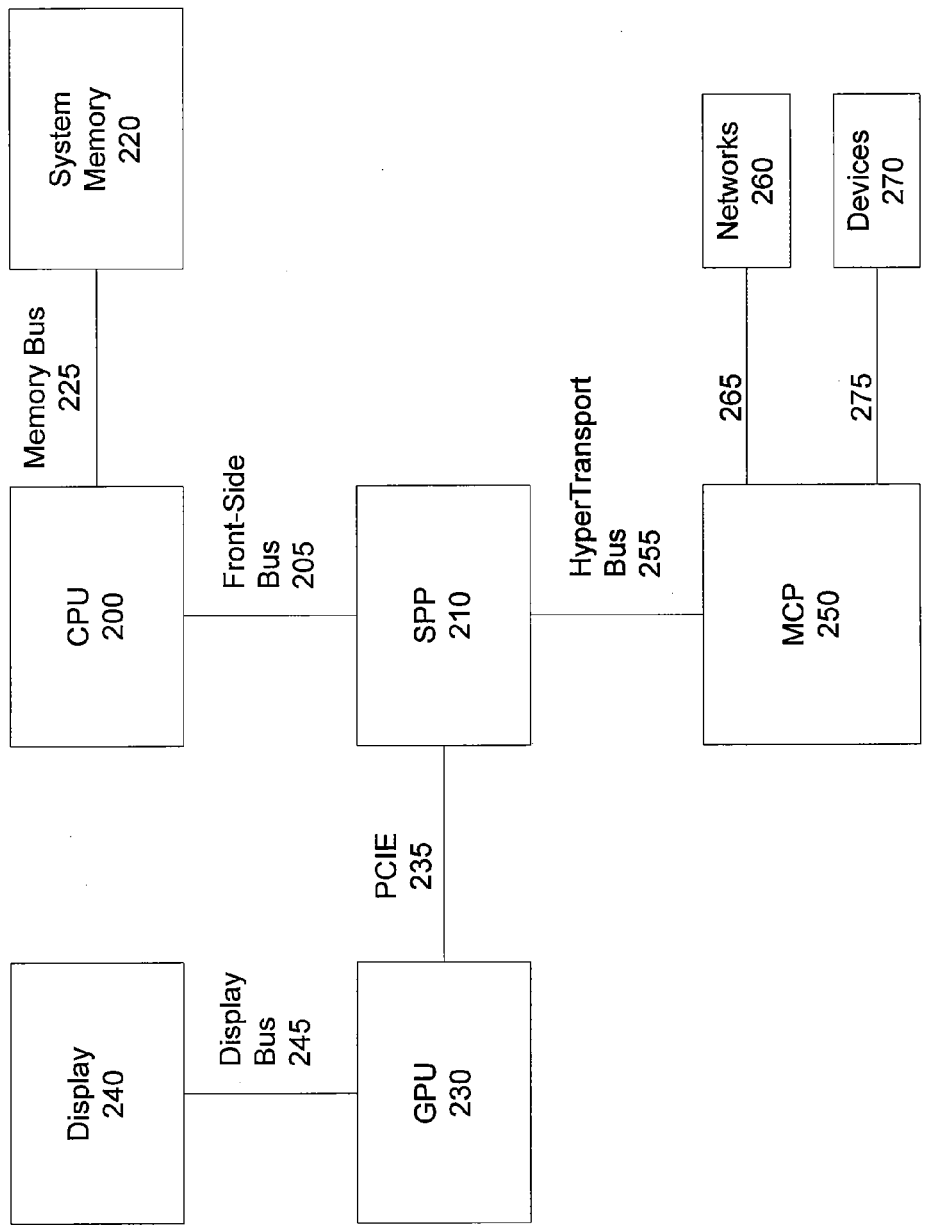
FIG. 2 is a block diagram of another computing system that is improved by incorporating an embodiment of the present invention.

FIG. 2 is a block diagram of another computing system that is improved by incorporating an embodiment of the present invention. This block diagram includes a central processing unit or host processor 200, SPP 210, system memory 220, graphics processing unit 230, display 240, MCP 250, networks 260, and internal and peripheral devices 270.

The CPU 200 communicates with the SPP 210 via the front-side bus 205 and accesses the system memory 220 via the memory bus 225. The GPU 230 communicates with the SPP 210 over the PCIE bus 235 and provides data for display on display device 240. The MCP 250 communicates with the SPP 210 via a high-speed connection such as a HyperTransport bus 255, and connects networks 260 and internal and peripheral devices 270 to the remainder of the computer system.

As before, the central processing unit or host processor 200 may be one of the central processing units manufactured by Intel Corporation or other supplier and are well-known by those skilled in the art. The graphics processor 230, integrated graphics processor 210, and media and communications processor 250 are preferably provided by NVIDIA Corporation.

An architecture that is similar to the zero-frame-buffer architecture does not eliminate the use of a local memory, but rather reduces the local memory to a smaller memory that is either included on the graphics processing unit 230 or remains external to it. This smaller memory is used for specialized purposes, while most data is stored in the system memory. This architecture is also improved by the incorporation of embodiments of the present invention and can be incorporated into systems such as those shown in FIGS. 1 and 2, as well as the other types of systems, including those discussed herein.

Zero-frame-buffer (and near zero-frame-buffer) systems according to embodiments of the present invention provide board simplification and cost reductions by eliminating the need for a local frame buffer or graphics memory, instead using portions of a system memory. That is, instead of having a locally directly accessible memory, the zero-frame-buffer GPU typically accesses portions of a system memory through a Northbridge or similar device, and possibly via a CPU as well. For example, in FIG. 1, the GPU 130 accesses the system memory 120 via the system platform processor 110. Similarly, in FIG. 2, the GPU 230 accesses the system memory 220 via the system platform processor 210 and the CPU 200. This means that when the intermediary devices are otherwise occupied, data requested from the system memory 220 by the GPU 230 may be delayed.

This delay can cause problems in a number of circumstances. For example, the GPU 230 periodically reads pixel or display data from the system memory 220. At these times, the GPU 230 requires a steady flow of display data. If this flow of data is interrupted, meaningless data may be displayed, thus corrupting the image viewed by a user. This may be caused by a CPU 200 exiting a low-power state while data is being transferred from a system memory to a GPU 230. The CPU 200 takes time to exit to low-power state, which stalls data transfers from memory. An example of this is shown in the following series of figures.

Figure 3A:
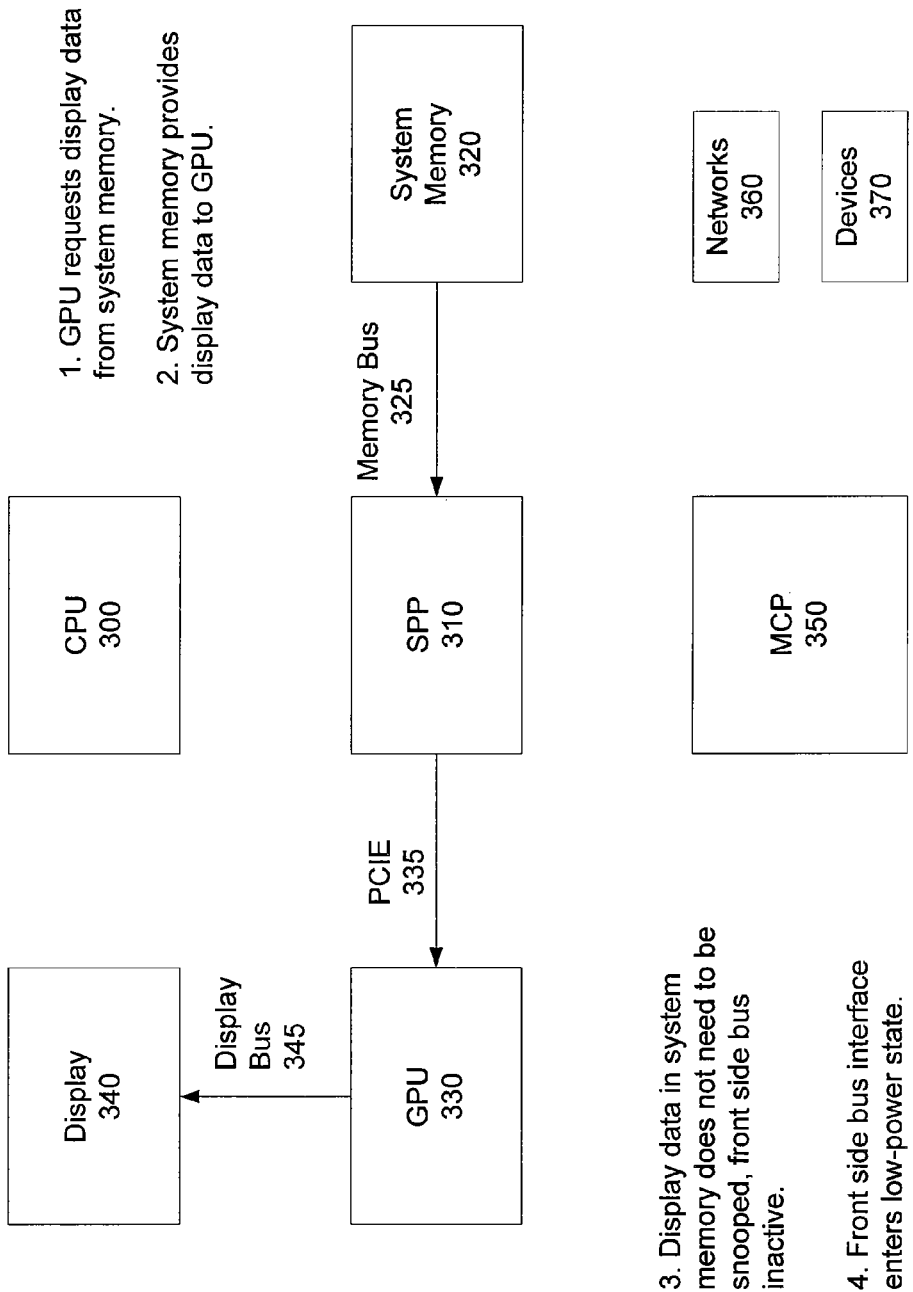
FIGS. 3A-B illustrate an interruption in display data transfers that can occur in a zero frame buffer system.
Figure 3B:
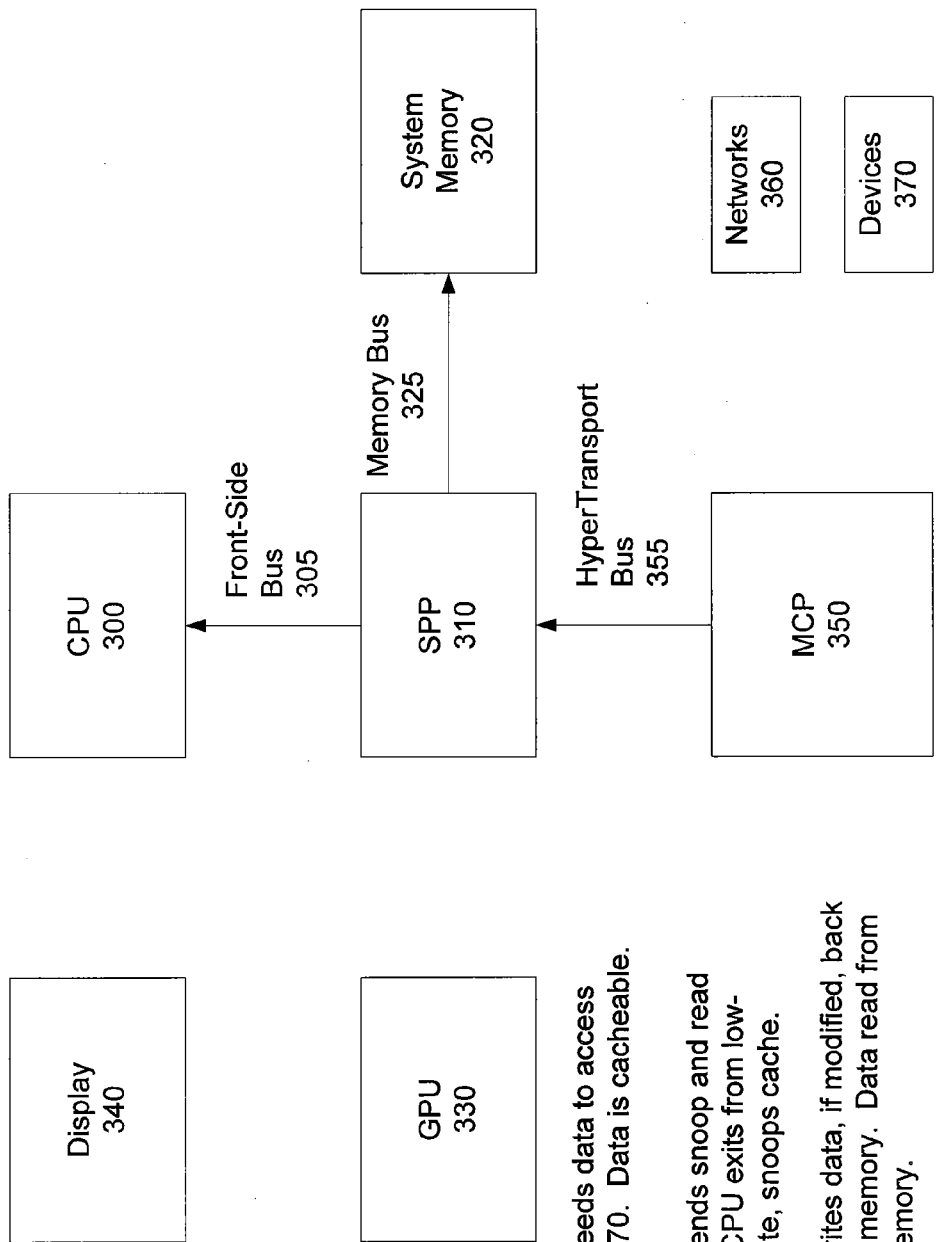

FIGS. 3A-B illustrate an interruption in display data transfers that can occur in a zero frame buffer system. This interruption is rectified by the incorporation of an embodiment of the present invention. In FIG. 3A, the GPU 330 requests data from the system memory 320. This request is made via the POE bus 335 to the system platform processor or Northbridge 310. The system platform processor 310 reads data from the system memory 320 and provides it for display on the GPU 330.

Display data is not used or modified by the CPU 300. Accordingly this data is typically not cached by the CPU 300. Since this data is not cached by the CPU 300, the system platform processor 310 does not snoop the CPU cache to see if the CPU has modified the data. Accordingly, since the CPU 300 is not involved in the transfer of display data from the system memory to the GPU, in the absence of other system activity, the CPU front side bus is inactive. As a result of this inactivity, to save power, the CPU 300, or in the front side of bus controller or interface for the CPU 300, may enter a lower-power state.

In FIG. 3B, other system activity occurs, thereby waking up the CPU 300, or the front side bus circuitry in the CPU 300, during the transfer of display data from the system memory 320 to the GPU 330. In this specific example, the media communications processor 350 needs to access devices 370, for example over a USB bus. The media communication processor 350 may need specific information regarding those devices, such as bus addresses, communication protocol information, or other data. This data is stored in the system memory 320 and is also cached in the CPU 300. Accordingly, the media communications processor 350 provides a snoop and read request to the system platform processor 310 via the HyperTransport bus 355. In various embodiments of the present invention, the snoop and read requests may be separate requests, or they may be included in the same request. The CPU exits the low-power state and checks its cache to see if it has modified this data since the data was written to the system memory 320. If this data has been modified, for example, a dirty bit associated with the data in the cache is set, the CPU 300 writes the data back to the system memory 320 before it is read and used by media communications processor 350.

In this example, the CPU 300 needs to check its cache for possible changes to the data requested by the media communications processor 350. Accordingly, the CPU 300, or its front side bus interface or controller circuitry, needs to exit the lower-power state and enter a higher-power state. This change in state causes a delay in the memory reads of the data provided by the system memory 320. Under certain circumstances, this can lead to a deprivation of display data being transferred to the GPU 330. When this happens, undesirable visible artifacts may appear on the display monitor 340.

In this particular example, the delay occurs for display data. Alternately, other types of data may experience an undesirable delay. For example, transfers in vertex, pixel, geometry, computational, or other types of data may be undesirably delayed. Also, in this particular example, the delay was caused by memory reads by the media communications processor 350. Alternately, such delays may be caused by memory reads by the GPU 330 itself, devices attached to the networks 360, the devices 370, or other circuits either shown or not shown in these figures. Further, while in this example, the CPU exited the low-power state due to a cache snoop, other types of transactions, such as an interrupt, may similarly cause the CPU 300 to change state.

Accordingly, embodiments of the present invention provide transactions that cause the CPU 300 to change state before data transfers such as the transfer of display data from system memory to GPU take place. In this way, when other transaction such as a snoop by the media communications processor 350 occurs, the CPU 300 is already in a higher-power state and does not need to leave the lower-power state. In this way, any resulting delay is minimized. An example is shown in the following series of figures.

Figure 4B:
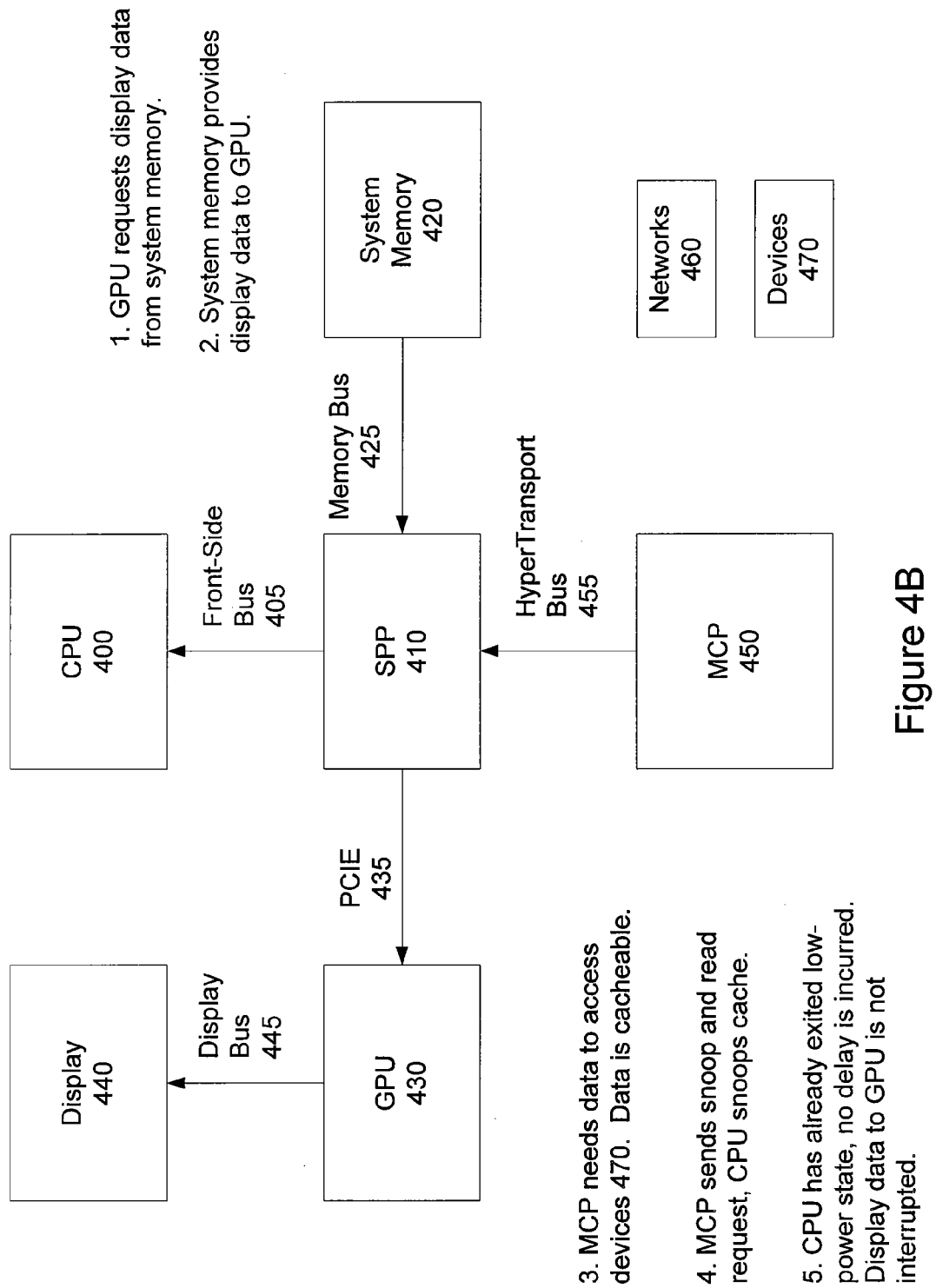

In FIGS. 4A-B, a GPU initiates a snoop request prior to a request for display data according to an embodiment of the present invention. This prevents the CPU 400 from possibly exiting the lower-power state during the transfer of display data and thus interrupting the flow of data to the GPU 430.

In FIG. 4A, the GPU 430 provides a dummy snoop request to the CPU 400. The CPU 400, or its front-side bus interface or controller circuitry, exits the low-power state if necessary in order to carry out this snoop. In a specific embodiment of the present invention, the GPU 430 may snoop a cache location corresponding to a "scratch" space in system memory 420 used by the GPU 430. In other embodiments of the present invention, the GPU 430 may snoop other memory locations, or it may provide other transactions, such as an interrupt, that require activity by the CPU front-side bus controller or interface circuitry.

In FIG. 4B, the GPU 430 requests display data from the system memory 420. The system memory 420 transfers display data to the GPU 430. Again, in this example, the media communications processor 450 needs to access devices 470. As before, this data is cacheable in the CPU 400 cache. Accordingly, the media communications processor 450 sends a snoop and read request to the CPU 400. These may be separate transactions, or they may be one transaction. The CPU snoops its cache and determines whether it has modified this data since it was stored in the system memory 420. However, since the CPU has already exited the lower-power state, no delay in the transfer of data from the system memory 420 to the GPU 430 is incurred. Thus, display data provided to the GPU 430 by the system memory for 20 is not interrupted.

Again, in various embodiment of the present invention, the entire CPU 400 may enter and exit a low-power state. In other embodiments of the present invention, various portions of the CPU, such as the front-side bus interface or controller for the CPU 400, may enter and exit the low-power state independently from the rest of the CPU 400. Also, CPUs may have more than one low-power state. They may have two or more different lower-power states, for three or more possible states. For example, there may be a high power state, a low-power state, and an intermediate power state. In such embodiment, to avoid data delays, it may be sufficient to ensure that the CPU 400 be in either the high-power or intermediate-power state. That is, it may only be necessary to ensure that the CPU does not enter the low-power state. In other embodiments, it may be necessary to ensure that the CPU be in the high-power state. This may determine the type of transaction sent to the CPU 400 before a request for display or other data is made to the system memory 420. For example, other types of transaction may be used instead of cache snoop or interrupts. One specific embodiment of the present invention sends a transaction that has the CPU enter a state that consumes the least amount of power while ensuring that if the CPU enters a higher-power state, concurrent data transfers are not interrupted.

Accordingly, embodiments of the present invention provide a transaction ahead of a data transfer, where the transaction places a CPU or other device in a higher-power state before the data transfer, in order to avoid a change in state that would otherwise disrupt the data transfer. In this specific example, a dummy snoop request is issued ahead of a display data request to ensure that the CPU remains in a higher-power state. This prevents the CPU from exiting a lower-power state and interrupting the data transfer.

Accordingly, embodiments of the present invention need to provide requests a sufficient amount of time before the data transfer to ensure that the CPU can exit the low-power state before the transfer of data needs to occur. In the case of display data, this timing is a function of a number of variables. For example, the display 440 may have a high resolution which causes display data provided by the system memory 420 to be consumed more rapidly. Similarly, the frame rate being displayed may be high, which again increases the amounts of data that need to be transferred. Other factors include the rate at which the system memory 420 can provide data. An example of such a circuit is shown in the following figure.

Figure 5:
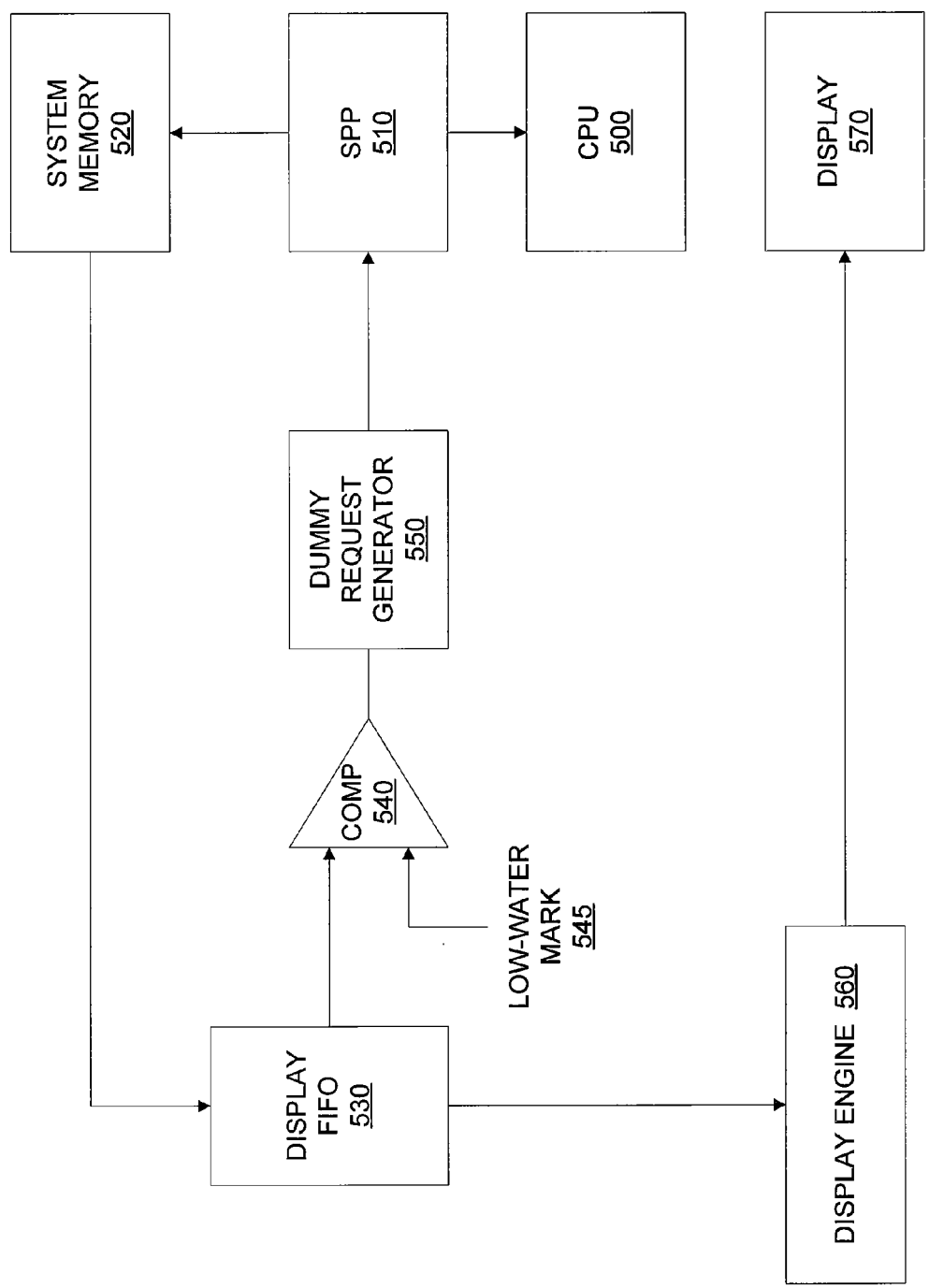
FIG. 5 illustrates a circuit that issues dummy snoop requests ahead of a data transfer according to an embodiment of the present invention.

FIG. 5 illustrates a circuit that issues dummy snoop requests ahead of a data transfer according to an embodiment of the present invention. This figure includes a central processing unit 500, system platform processor 510, system memory 520, display FIFO 530, display engine 560, comparator 540, dummy request generator 550, and monitor or display 570. Typically, the system platform processor 510, system memory 520, and display 570, are external to the GPU, while the display FIFO 530, comparator 540, dummy request generator 550, and display engine 560 are included on the GPU.

In this example, the display engine 560 provides data to be displayed on the display or monitor 570. The display engine 560 receives display data from the display FIFO 530. The display FIFO 530 is filled by the system memory 520 and drained by display engine 560. When the display FIFO 530 reaches a low-water mark 545, the comparator 540 is triggered and the dummy request generator 550 issues a dummy request to the system platform processor 510. The system platform processor 510 passes it to the CPU 500. If it needs to, the CPU 500 exits the low-power state and snoops its cache. Data can then be requested and received from the system memory 520.

Again, in the above examples, the data transferred is typically display data, though other types of data may be transferred. Also, the device needing data in the above examples is a GPU, though other types of devices may be requesting this data. Also, the device to be woken from the low-power state is a CPU in these examples, though in other embodiments of the present invention, other types of devices may need to be woken from a low-power state. An example of such a method is shown in the following flowchart.

Figure 6:
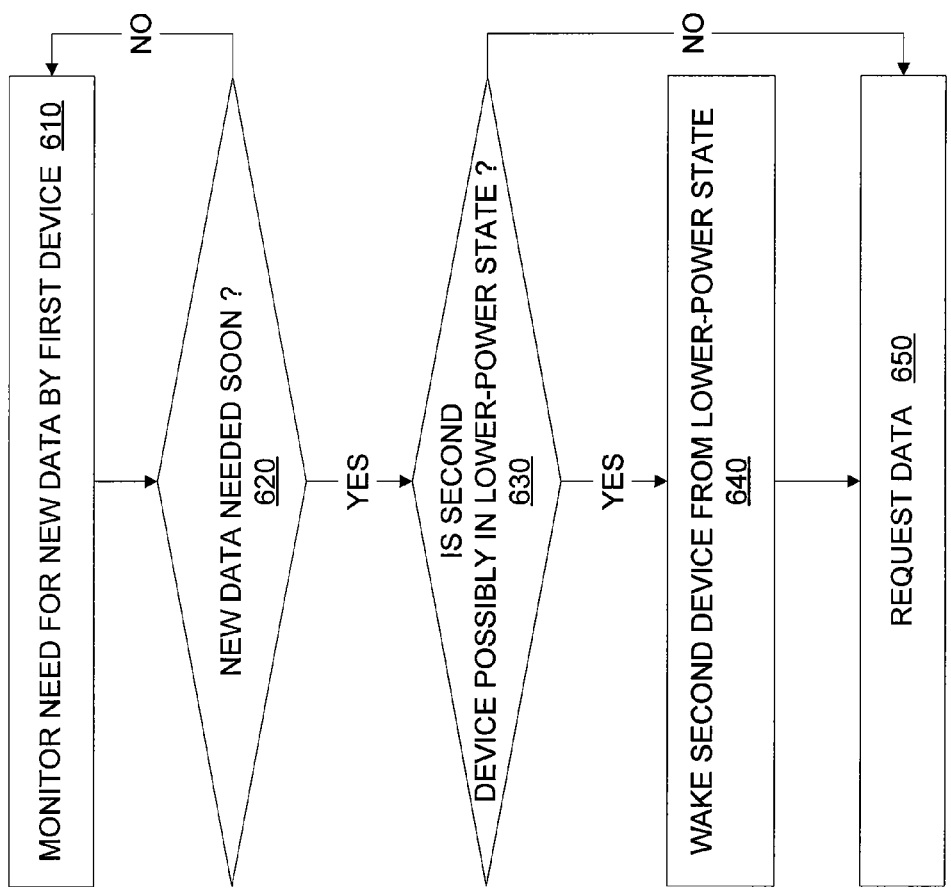
FIG. 6 is a flowchart of a method of preventing an interrupt in a data transfer caused by a device exiting a low-power state according to an embodiment of the present invention.

FIG. 6 is a flowchart of a method of preventing an interrupt in a data transfer caused by a device exiting a low-power state according to an embodiment of the present invention. In this flowchart, before new data is needed by a first device, a second device is woken from a low-power state. The pre-waking the second device prevents it from being woken later, which can possibly interrupt the data transfer.

Specifically, in act 610, the need for new data by a first device is monitored. In act 620, it is determined whether new data will be needed relatively soon. In various embodiments of the present invention, whether data will be needed soon is typically dependent on many factors, such as the rate of data consumption, latency times for data requests, the lead time needed to wake a second device, and others. If data will not be needed relatively soon, the need for new data by the first device continues to the monitored in act 610. If new data is needed relatively soon, it is determined in act 630 whether the second device is possibly in a lower-power state. For example, it may be known to the first device that the second device is not in a lower-power state because the first device has already woken the second device with an unrelated transaction.

If the second device can not possibly be in a lower-power state, then data can be requested when needed in act 650. If the second device can possibly be in a lower-power state, the second device is woken from the lower-power state in act 640. Again, data can be requested in act 650.

Again, in a specific embodiment of the present invention, the data transferred is display data and dummy snoop requests are issued to the CPU ahead of time to prevent the CPU from exiting the low-power state during the transfer of display data. An example of this specific embodiment is shown in the following figure.

Figure 7:
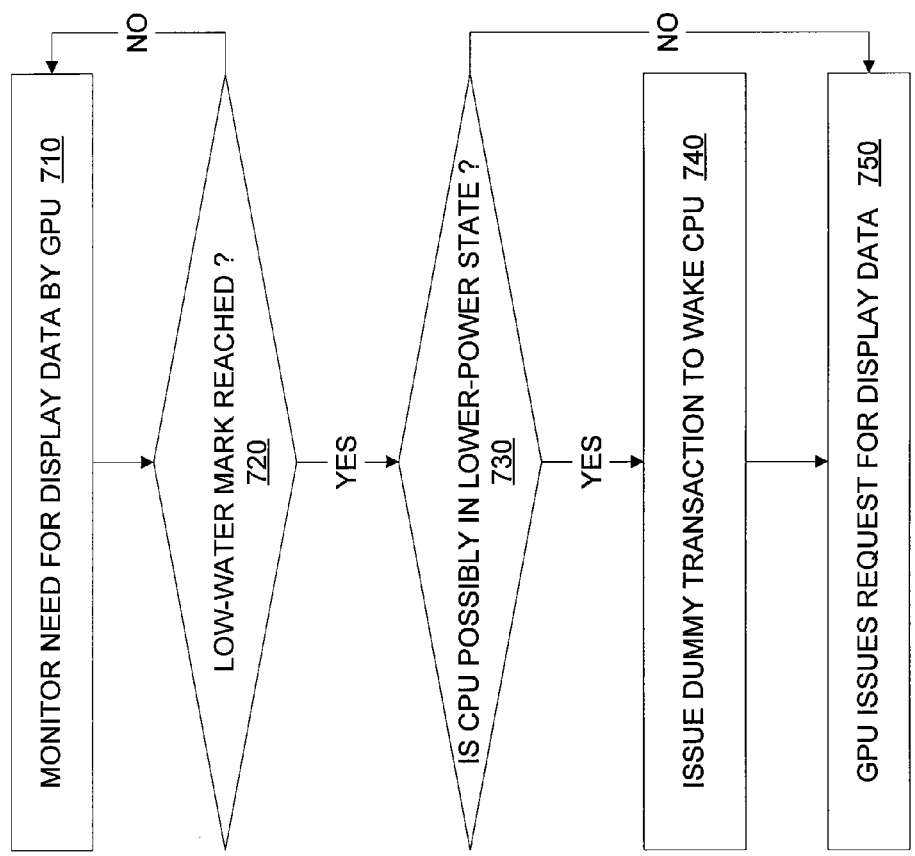
FIG. 7 is a flowchart of a method of issuing dummy transactions to wake a CPU ahead of a transfer of display data according to embodiment of the present invention.

FIG. 7 is a flowchart of a method of issuing dummy transactions to wake a CPU ahead of a transfer of display data according to embodiment of the present invention. Again, this method is particularly useful in a zero frame buffer system, though it may be incorporated in other types of systems and in other embodiments of the present invention. In this specific example, before a request for display data is made, a dummy transaction, such as a dummy snoop request is made by the GPU to the CPU. This prevents the CPU from needing to exit the low-power state while displayed data is being transferred, which may interrupt the transfer of display data and corrupt the image being displayed on a monitor.

Specifically, in act 710, a need for data by the GPU is monitored. In act 720, it is determined whether a low-water mark has been reached. If it has not, the need for data by the GPU is continued to be monitored in act 710. If the low-water mark has been reached in act 720, it is determined in act 730 whether the CPU may possibly be in a lower-power state. For example, the GPU may have recently sent a snoop request, interrupt, or other such transaction to the CPU. In this case, it would be known to the GPU that the CPU is not in the lower-power state in act 730. In such a case, the GPU can go ahead and issue a request for display data at the appropriate time in act 750. If the CPU can possibly be in a lower-power state in act 720, then a dummy transaction to wake the CPU is issued in act 740. Following this, the GPU can request data at the appropriate time in act 750.

In some circumstances, only one transaction such as a snoop or interrupt is sent to wake the second device, which may be a CPU or other device. In other circumstances, for example where the data transfer is long, additional transactions may be needed to keep the second device from returning to a low-power state.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of transferring data comprising:
    with a first device, determining that data will be needed to be transferred from an external memory to the first device within a first period of time;
    determining whether a second device is in a lower-power state, and if the second device is in a lower-power state, then transmitting a first transaction to the second device such that the second device exits the lower-power state and enters a higher-power state, otherwise not transmitting the first transaction to the second device;
    requesting data from the external memory; and
    receiving data from the external memory.

2. The method of claim 1 wherein the first transaction comprises a snoop request.

3. The method of claim 1 wherein the first transaction comprises an interrupt.

4. The method of claim 1 wherein the second device is a CPU.

5. The method of claim 1 wherein the data requested from the external memory comprises display data.

6. The method of claim 1 wherein requesting data from an external memory comprises requesting display data from a system memory.

7. The method of claim 1 wherein the first period of time is determined by a monitor resolution and a frame rate.

8. A method of transferring data comprising:
   determining that data will be needed to be transferred within a first period of time;
   determining whether a first transaction has been transmitted such that if a CPU was in a lower-power state, the CPU has exited the lower-power state and entered a higher-power state; and
   if the first transaction has not been transmitted, then transmitting a second transaction such that if the CPU is in a lower-power state, the CPU will exit the lower-power state and enter a higher-power state, and if the first transaction has been transmitted, then not transmitting the second transaction; then
   requesting data from an external memory; and
   receiving data from the external memory.

9. The method of claim 8 wherein the second transaction comprises a snoop request.

10. The method of claim 8 wherein the second transaction comprises an interrupt.

11. The method of claim 8 wherein the second transaction is transmitted to the CPU via a system platform processor.

12. The method of claim 8 wherein the data requested from the external memory comprises display data.

13. The method of claim 8 wherein requesting data from an external memory comprises requesting display data from a system memory.

14. The method of claim 13 further comprising providing the display data to a monitor.

15. A method of transferring data comprising:
   in a graphics processor, determining that a low-water mark has been reached in a first-in-first-out memory;
   determining whether a central processing unit may be in a lower-power state, and if the central processing unit may be in a lower-power state, then sending a first transaction to the central processing unit such that if the central processing unit is in a lower-power state, the central processing unit exits the lower-power state and enters a higher-power state, otherwise not sending the first transaction to the central processing unit; and
   issuing a request for data.

16. The method of claim 15 wherein determining that a low-water mark has been reached in a first-in-first-out memory comprises determining that a low-water mark has been reached in a display first-in-first-out memory.

17. The method of claim 15 wherein issuing a request for data comprises issuing a request for data to be read from an external memory.

18. The method of claim 17 wherein issuing a request for data comprises issuing a request for data to the central processing unit.

19. The method of claim 15 wherein issuing a request for data comprises issuing a request for display data.

20. The method of claim 15 wherein sending a first transaction comprises sending a snoop request.

* * * * *